(12) United States Patent
Kim

(10) Patent No.: US 8,244,293 B2
(45) Date of Patent: Aug. 14, 2012

(54) DUAL MODE MOBILE COMMUNICATION TERMINAL AND METHOD OF SELECTING MODE THEREIN

(75) Inventor: Ji Eun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 579 days.

(21) Appl. No.: 12/152,565

(22) Filed: May 14, 2008

(65) Prior Publication Data

US 2008/0300007 A1 Dec. 4, 2008

(30) Foreign Application Priority Data

May 29, 2007 (KR) .................... 10-2007-0051952

(51) Int. Cl.
*H04M 1/00* (2006.01)
(52) U.S. Cl. ................. 455/550.1; 455/552.1
(58) Field of Classification Search ........... 455/550.1, 455/552.1
See application file for complete search history.

(56) References Cited

U.S. PATENT DOCUMENTS

| 2002/0154632 | A1 | 10/2002 | Wang et al. | |
|---|---|---|---|---|
| 2005/0164737 | A1* | 7/2005 | Brown | 455/558 |
| 2006/0095600 | A1* | 5/2006 | Lee et al. | 710/14 |
| 2007/0254646 | A1* | 11/2007 | Sokondar | 455/432.1 |
| 2007/0293263 | A1* | 12/2007 | Eslambolchi et al. | 455/552.1 |
| 2008/0167033 | A1* | 7/2008 | Beckers | 455/432.3 |

FOREIGN PATENT DOCUMENTS

| CN | 1741644 A | | 3/2006 |
|---|---|---|---|
| DE | 103 42 530 A1 | | 4/2005 |
| EP | 1051052 A1 | * | 11/2000 |
| EP | 1 718 087 A1 | | 11/2006 |
| WO | WO 98/10617 A1 | | 3/1998 |

OTHER PUBLICATIONS

European Search Report dated Nov. 18, 2009 in connection with European Patent Application No. EP 08 00 5321.

Office Action dated Nov. 12, 2010 in connection with Chinese Patent Application No. 200810095566.1.

\* cited by examiner

*Primary Examiner* — Marisol Figueroa

(57) ABSTRACT

A dual mode mobile communication terminal and a method of selecting a mode therein that can minimize a call cost are provided. The method of selecting a mode in a dual mode mobile communication terminal into which at least two cards are inserted includes: requesting mode selection; selecting a card and a mode that can minimize a call cost according to a provider network to connect to based on previously stored call cost information for each provider and the at least two cards; and connecting to a corresponding provider network using the selected mode.

20 Claims, 4 Drawing Sheets

DUAL MODE MOBILE COMMUNICATION TERMINAL AND METHOD OF SELECTING MODE THEREIN

CROSS-REFERENCE TO RELATED APPLICATION(S) AND CLAIM OF PRIORITY

This application claims priority to an application entitled "DUAL MODE MOBILE COMMUNICATION TERMINAL AND METHOD OF SELECTING MODE THEREIN" filed in the Korean Intellectual Property Office on May 29, 2007 and assigned Serial No. 2007-0051952, the contents of which are incorporated herein by reference.

TECHNICAL FIELD OF THE INVENTION

The present invention relates to a mobile communication terminal, and more particularly, to a dual mode mobile communication terminal and a method of selecting a mode therein that can minimize a call cost.

BACKGROUND OF THE INVENTION

In general, in an area in which different mobile communication networks are provided, when roaming to a mobile communication network of another provider, a dual mode (or dual standby mode) mobile communication terminal is used.

The dual mode mobile communication terminal has two card slots, and an available mode can be changed according to cards inserted into the card slots.

For example, if a Code Division Multiple Access User Identity Module (CDMA UIM) card is inserted into one card slot of the dual mode mobile communication terminal and no card is inserted into the other card slot of the dual mode mobile communication terminal, the mobile communication terminal is operated with only a single mode method operating with only a CDMA mode.

Further, if a global system for mobile communication (GSM) SIM (Subscriber Identity Module) card is inserted into one card slot of the dual mode mobile communication terminal and a CDMA UIM card is inserted into the other card slot of the dual mode mobile communication terminal, the dual mode mobile communication terminal can be operated with a dual mode method operating with only one or both of a GSM mode and a CDMA mode.

In general, cards inserted into the dual mode mobile communication terminal include a CDMA UIM card, GSM SIM card, and a dual card for supporting both a CDMA mode and a GSM mode.

As described above, when cards are mounted in two card slots, the mobile communication terminal can be operated with a dual mode, and the mobile communication terminal can be operated with various modes according to a kind of a card inserted into each card slot.

In the prior art, upon booting or roaming the mobile communication terminal, the mobile communication terminal connects to a corresponding communication network by selecting one of the various modes. In this case, the mobile communication terminal selects a mode selected by a user or a predesignated mode among various available modes.

In most cases, the mobile communication network has different providers available according to an area covered by each provider, and constructs an individual service network according to a provider. A call cost varies according to a corresponding provider, a provider to which a card used in connecting to a corresponding provider network is subscribed, and a mode used in connecting to a corresponding provider network.

For example, when each of a CDMA UIM card subscribed to a provider A and a dual (CDMA/GSM) card subscribed to a provider B is inserted into a dual mode mobile communication terminal, in a service area of the provider A and a service area of a provider C having a cooperation relationship with the provider A, a call cost is cheaper when receiving a communication service using a CDMA mode of a CDMA UIM card subscribed to the provider A than when receiving a communication service using a CDMA mode of a dual mode card subscribed to the provider B.

However, in the prior art, as described above, because the dual mode mobile communication terminal connects to a corresponding provider network by selecting a user selected mode or a predesignated mode without considering a cost thereof, a user may frequently unnecessarily use a mode charging a relatively expensive call cost.

SUMMARY OF THE INVENTION

To address the above-discussed deficiencies of the prior art, it is a primary object to provide a dual mode mobile communication terminal and a method of selecting a mode therein that can minimize a call cost according to a provider network.

The present invention further provides a dual mode mobile communication terminal and a method of selecting a mode therein that can select a mode to minimize a call transmission cost in a corresponding provider network when a specific event for selecting a mode is generated.

In accordance with an aspect of the present invention, a method of selecting a mode in a dual mode mobile communication terminal into which at least two cards are inserted includes: requesting mode selection; selecting a card and a mode that can minimize a call cost according to a provider network to connect to based on previously stored call cost information for each provider and the at least two cards; and connecting to the corresponding provider network using the selected mode.

In accordance with another aspect of the present invention, a dual mode mobile communication terminal includes: at least two card slots, each for inserting a card; a first communication unit for transmitting, receiving and processing a signal of a first communication method; a second communication unit for transmitting, receiving and processing a signal of a second communication method; an input unit for input by a user; a display unit for providing a visual user interface screen to the user; a storage unit for storing call cost information for at least one provider according to a communication card and a mode; and a controller for setting a card and a mode for minimizing a call transmission cost according to a card inserted into a card slot, a currently positioned area, and call cost information for each provider.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless terminals.

Figure 1:
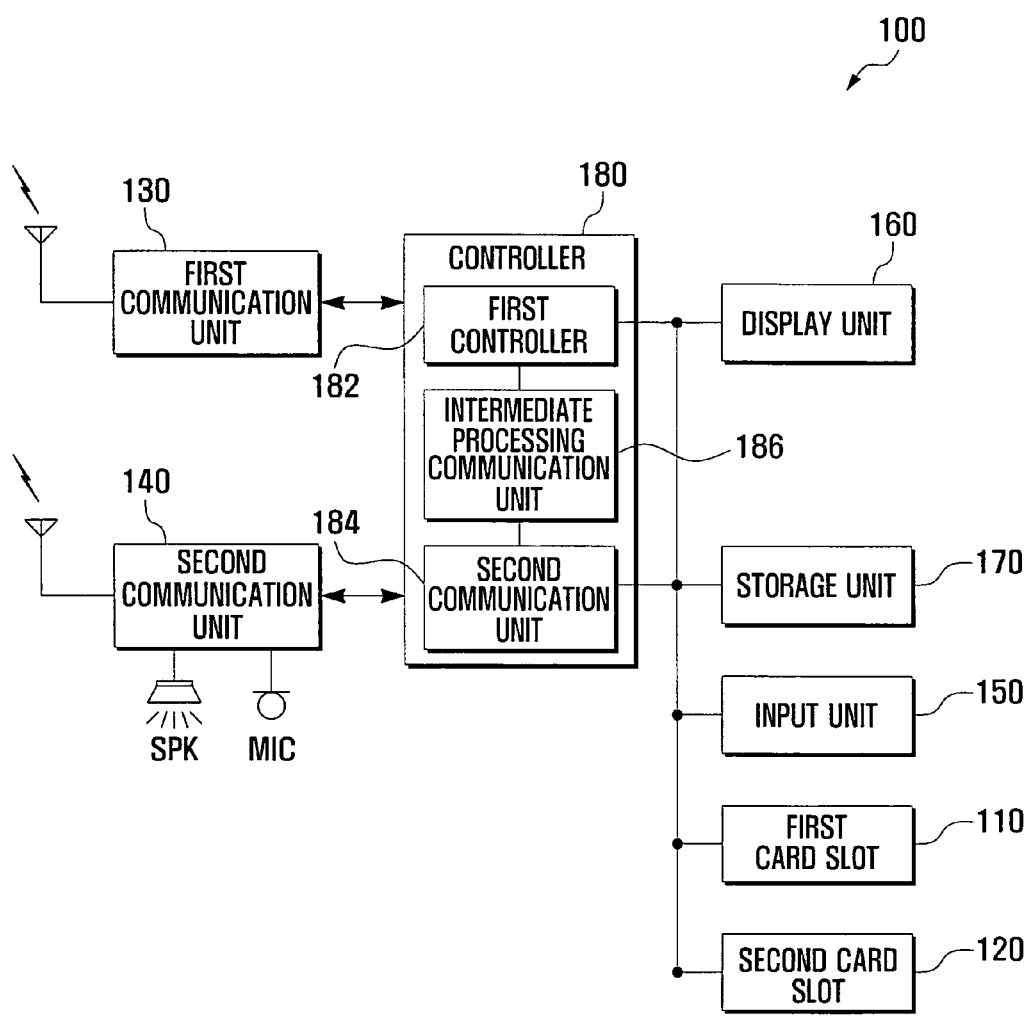
FIG. 1 is a block diagram illustrating a configuration of a dual mode mobile communication terminal according to an exemplary embodiment of the present invention.

FIG. 1 is a block diagram illustrating a configuration of a dual mode mobile communication terminal according to an exemplary embodiment of the present invention.

Referring to FIG. 1, a dual mode mobile communication terminal 100 includes a first card slot 110 and a second card slot 120 for inserting a card, a first communication unit 130 for transmitting, receiving and processing a signal of a first communication method, a second communication unit 140 for transmitting, receiving and processing a signal of a second communication method, an input unit 150 for input by a user, a display unit 160 for providing a visual user interface screen to the user, a storage unit 170 for storing call cost information for each provider according to a communication card and a mode, and a controller 180 for setting a card and a mode for minimizing a call cost according to a card inserted into the first card 110 and second card slot 120, an area in which the mobile communication terminal 100 is currently positioned, and the call cost information for each provider.

A card for receiving at least one communication service of CDMA and GSM can be inserted into the first card 110 and second card slot 120. The cards may be cards subscribed to providers for providing corresponding communication services. For example, a CDMA UIM card for receiving a CDMA service may be a card subscribed to a provider A providing a CDMA service, and a GSM SIM card for receiving a GSM service may be a card subscribed to a provider B providing a GSM service.

The first communication method may include at least one communication method of CDMA and GSM. The second communication method may include a communication method that is not included in the first communication method of CDMA and GSM. That is, the first communication method and the second communication method may be different.

The input unit 150 includes at least one of a keypad and a touch pad, and can be formed in a single touch panel (or touch screen) form together with the display unit 160 to perform an input function and a display function within a single unit.

The controller 180 includes a first controller 182 for controlling the first communication unit 130, a second controller 184 for controlling the second communication unit 140, and an intermediate processing communication unit 186 for performing mutual communication between the first communication unit 130 and the second communication unit 140.

One of the first controller 182 and the second controller 184 is set to be a main controller for controlling an entire control unit and the other thereof is set to be a sub-controller for controlling a communication related function of a corresponding communication unit. The setting of the first controller 182 and the second controller 184 to be a main controller and a sub-controller varies according to a situation.

The storage unit 170 can store call cost information for each provider according to a communication card and a mode in a form shown in Table 1. The call cost information for each provider, such as that in Table 1, may be stored in a default, be automatically updated in a system, or be directly updated by a user. Table 1 illustrates a call cost information table in the Korean currency for each provider according to a communication card and a mode in an exemplary embodiment of the present invention.

TABLE 1

| | | | Call cost for each provider (Korean Won/10 secs) | | |
|---|---|---|---|---|---|
| Item | Communication card | Mode | Provider A | Provider B | Provider C |
| 1 | CDMA UIM | CDMA | 15 | 20 | 22 |
| 2 | GSM SIM | GSM | 23 | 14 | 25 |
| 3 | Dual | CDMA | 17 | 19 | 20 |
| | | GSM | 21 | 16 | 24 |

In Table 1, the CDMA UIM card is a card subscribed to the provider A, the GSM SIM card is a card subscribed to the provider B, and the dual card is a card subscribed to both providers A and B.

When selecting a mode, the controller 180 (or a main controller) can select a card and a mode for minimizing a call transmission cost according to a provider network to connect to based on call cost information for each provider and a currently inserted card, such as that in Table 1.

For example, when a CDMA UIM card is inserted into one of at least two card slots and a dual card is inserted into another (corresponding to Item 1 and Item 3 of Table 1) of the dual mode mobile communication terminal 100, if an event (for example, an event notifying a change of a service state or a roaming status) requesting mode selection is generated in a service network of the provider A, the controller 180 can select the cheapest mode, i.e., the CDMA mode of the CDMA UIM card instead of that of the dual card, according to call cost information for each provider in Table 1.

Further, as the dual mode mobile communication terminal 100 roams from a service network of the provider A to a service network of the provider B, if an event notifying a change of a roaming status is generated, the controller 180 can select a GSM mode of the dual card that can most cheaply use a service of the provider B, which is a provider of an area in which the dual mode mobile communication terminal 100 is currently positioned.

When the dual mode mobile communication terminal 100 roams to a service network of a provider C by moving from a service area of the provider A or the provider B to a service area of the provider C, the controller 180 can select a CDMA mode of the dual card for achieving the cheapest cost according to call cost information of the provider C.

If mode selection is completed, the controller 180 can register the selected mode in a variable value of a call cost minimizing mode.

The variable value that can be registered in the call cost minimizing mode is shown in Table 2.

TABLE 2

| Item | Variable value | Meaning |
|---|---|---|
| 1 | SLOT_1_CDMA_MODE | The cheapest cost is using a CDMA mode of the CDMA UIM card or of the dual card inserted into the first slot, therefore call transmission is tried using the said card. |
| 2 | SLOT_1_GSM_MODE | The cheapest cost is using a GSM mode of the GSM SIM card or of the dual card inserted into the first slot, therefore call transmission is tried using the said card. |
| 3 | SLOT_2_CDMA_MODE | The cheapest cost is using a CDMA mode of the CDMA UIM card or of the dual card inserted into the second slot, therefore call transmission is tried using the said card. |
| 4 | SLOT_2_GSM_MODE | The cheapest cost is using a GSM mode of the GSM SIM card or of the dual card inserted into the second slot, therefore call transmission is tried using the said card. |

For example, in the above-described case, when connecting to a service network of the provider C, the controller 180 can register Item 3 of Table 2, 'The cheapest cost is using a CDMA mode of the CDMA UIM card or of the dual card inserted into the second slot, therefore call transmission is tried using the said card.' in a variable value of a call cost minimizing mode in a form such as min_callcost_mode=SLOT_2_CDMA_MODE.

If mode selection is completed, the controller 180 can connect to a corresponding provider network in a selected mode.

Thereafter, if a call transmission event is generated, i.e. if the user attempts call transmission, the controller 180 can connect to a provider network in a mode registered in a variable value of the call cost minimizing mode.

The controller 180 can select a provider network, card, and mode for minimizing a call transmission cost based on call cost information for each provider and a currently inserted card, when selecting a mode in an area in which a plurality of provider networks overlap.

For example, it is assumed that a dual card is inserted into one of at least two card slots and a GSM SIM card is inserted into another (corresponding to Item 3 and Item 2, respectively, of Table 1) of the dual mode mobile communication terminal 100. In this case, when selecting a mode in an area in which services of both the provider A and the provider B are available, the controller can select the provider B and a GSM mode of the GSM SIM card for the cheapest cost (i.e. 14 Korean won/10 secs) according to call cost information for each provider in Table 1.

Further, when the dual mode mobile communication terminal moves from an area in which the service networks of the providers A and B overlap to an area in which the service networks of the providers A and C overlap, the controller 180 can select the provider A and a CDMA mode of the dual card for the cheapest cost (i.e. 17 Korean won/10 secs).

The dual mode mobile communication terminal 100 may selectively include further units having an additional function (not shown in the Figures), such as a camera module, a broadcasting reception module, an audio signal output device such as a speaker, a sound signal input device such as a microphone, a connection terminal for exchanging data with an external digital appliance, a terminal for charging a battery, and a digital sound source reproducing module such as an MP3 module.

Figure 2:
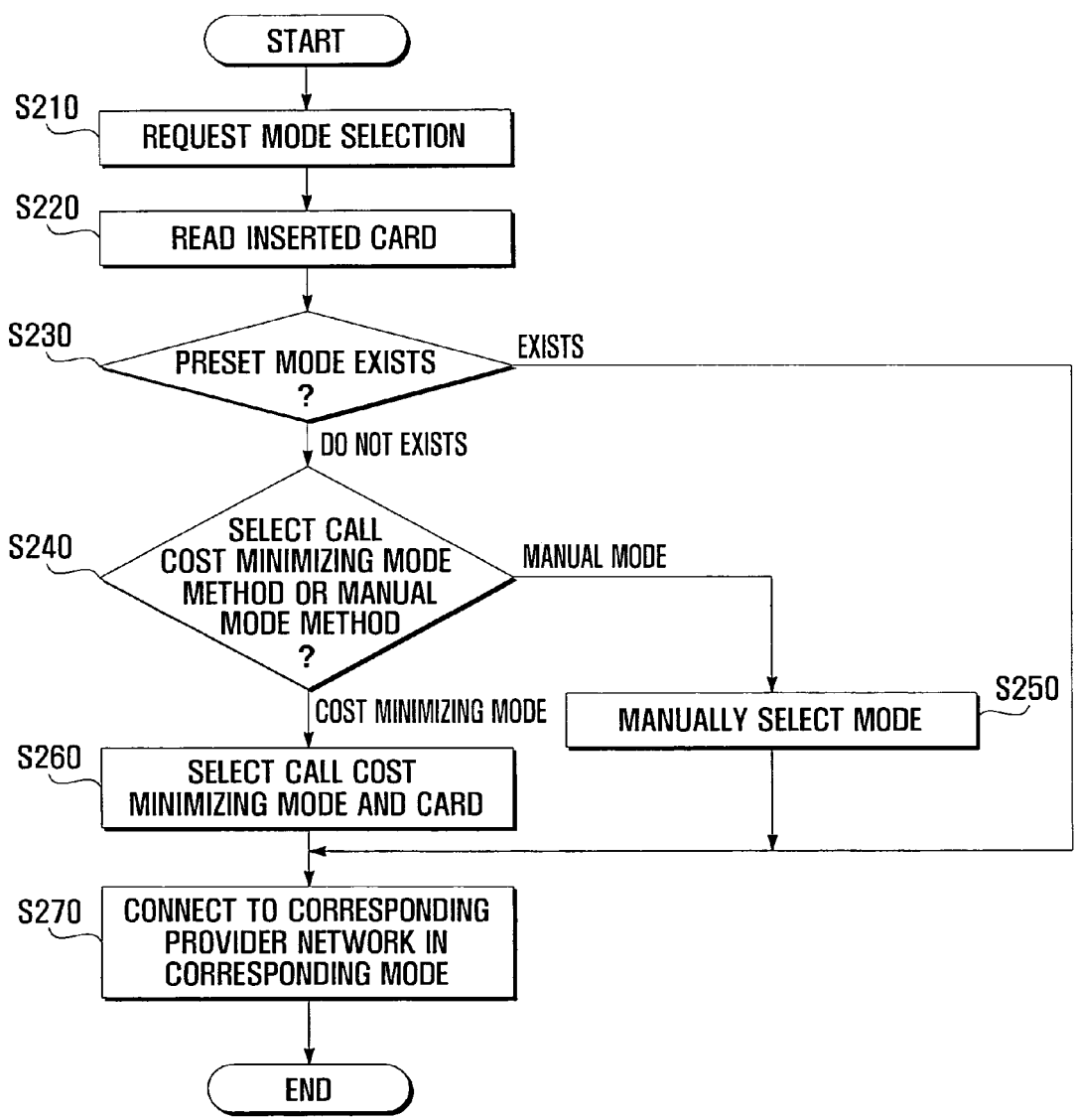
FIG. 2 is a flowchart illustrating a method of selecting a mode in a dual mode mobile communication terminal according to another exemplary embodiment of the present invention.

FIG. 2 is a flowchart illustrating a method of selecting a mode in a dual mode mobile communication terminal according to another exemplary embodiment of the present invention.

Referring to FIG. 2, when mode selection is requested (S210), the controller 180 reads a card inserted into a card slot (S220). In this case, the controller 180 can selectively check a Personal Identity Number (PIN) included in the card. The mode selection can be requested when a mobile communication terminal is booted, when an event notifying a change of a service state or a roaming status is generated, or when the user enters a call cost minimizing mode selection method in a menu.

The controller 180 determines whether a preset mode exists (S230).

If a preset mode exists, the controller 180 connects to a corresponding provider network in the corresponding mode (i.e. the preset mode) at step S270.

If a preset mode does not exist, the controller 180 determines whether a selection method of a call cost minimizing mode or of a manual mode is selected by the user (S240).

For this, the controller 180 can provide a screen in which a menu to be used in selecting a mode selection method is displayed for the user through the display unit 160.

Figure 3:
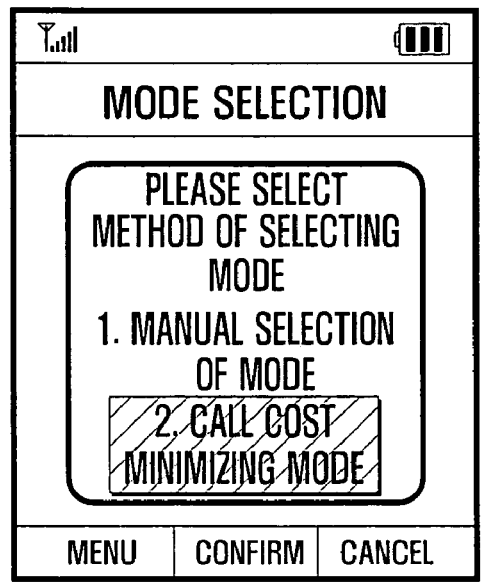
FIG. 3 is a diagram illustrating a screen for selecting a mode selection method according to the method of FIG. 2.

An example of such a screen is illustrated in FIG. 3.

FIG. 3 is a diagram illustrating a screen for selecting a mode selection method according to the method of FIG. 2.

If a manual mode selection method is selected by the user, a mode is then manually selected by the user (S250). For this, the controller 180 can display a mode list for helping the user to select a mode.

The controller 180 connects to a corresponding provider network in a corresponding mode (i.e. the mode selected by the user) (S270).

If a method of automatically selecting a mode for minimizing a cost is selected by the user at step S240, the controller 180 selects a card and a mode that can minimize a call cost according to a provider network to connect to based on the previously stored call cost information for each provider and a currently inserted card (S260).

The controller 180 connects to the corresponding provider network in the corresponding mode (i.e. the selected mode that can minimize a call cost) at step S270. The dual mode mobile communication terminal then enters a standby state.

As described above, information of the selected mode can be registered in a variable value of the call cost minimizing mode. When a call transmission event is generated by the user, the controller 180 can connect to the corresponding provider network using a mode registered in a variable value of the call cost minimizing mode.

Figure 4:
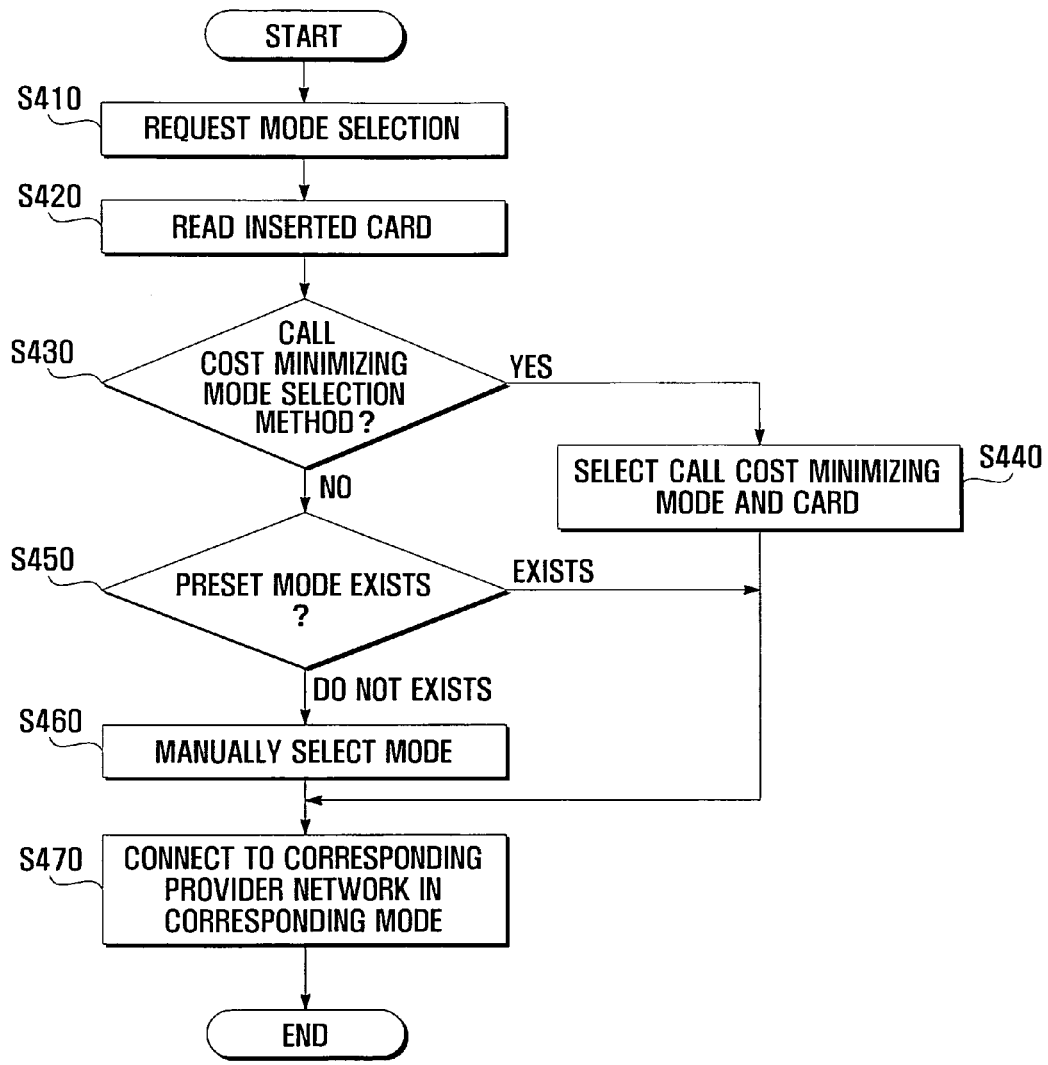
FIG. 4 is a flowchart illustrating another method of selecting a mode in a dual mode mobile communication terminal according to another exemplary embodiment of the present invention.

FIG. 4 is a flowchart illustrating another method of selecting a mode in a dual mode mobile communication terminal according to another exemplary embodiment of the present invention.

Referring to FIG. 4, when mode selection is requested (S410), the controller 180 reads a card inserted into the card slot (S420). In this case, the controller 180 can selectively check a Personal Identity Number (PIN) included in the card. The mode selection can be requested when the mobile communication terminal is booted, or when an event notifying a change of a service state or a roaming status is generated.

The controller 180 determines whether a call cost minimizing mode selection method is selected (S430). In order to help the user to select a call cost minimizing mode selection method, the controller 180 controls to provide a screen for inquiring whether to set a call cost minimizing mode through the display unit 160. An example of such a screen is illustrated in FIG. 5.

Figure 5:
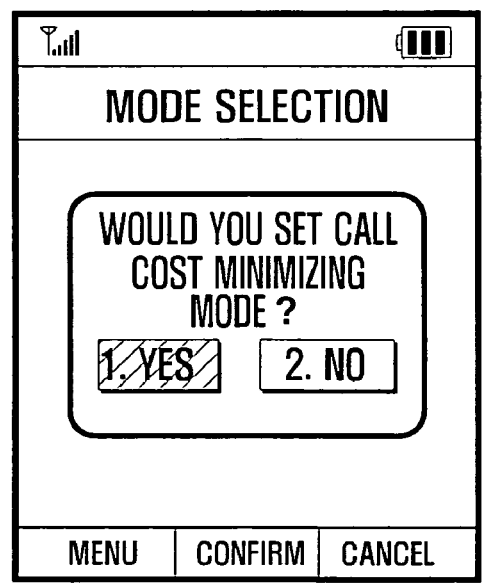
FIG. 5 is a diagram illustrating a screen for selecting a mode selection method according to the method of FIG. 4.

FIG. 5 is a diagram illustrating a screen for selecting a mode selection method according to the method of FIG. 4.

If a call cost minimizing mode selection method is selected, the controller 180 selects a card and a mode that can minimize a call cost according to a provider network to connect to based on the previously stored call cost information for each provider and a currently inserted card (S440).

The controller 180 connects to the corresponding provider network in the corresponding mode (i.e. the selected mode that can minimize a call cost) (S470).

As described above, information of the selected mode can be registered in a variable value of the call cost minimizing mode. When a call transmission event is generated by the user, the controller 180 can connect to the corresponding provider network using a mode registered in a variable value of the call cost minimizing mode.

If a call cost minimizing mode selection method is not selected at step S430, the controller 180 determines whether a preset mode exists (S450).

If a preset mode exists, the controller 180 connects to a corresponding provider network in a corresponding mode (i.e. the preset mode) at step S470.

If a preset mode does not exist, a mode is manually selected by the user (S460). For this, the controller 180 can display a mode list for helping the user to select a mode.

The controller 180 connects to the corresponding provider network in the corresponding mode (i.e. the mode selected by the user) at step S470.

An algorithm for minimizing a call cost according to the present invention can be operated in a state where a plurality of cards is inserted so that the dual mode mobile communication terminal may support a dual (standby) mode. Therefore, when a call cost minimizing mode is selected, the controller 180 determines whether a dual (standby) mode is available based on the inserted card. According to whether a dual (standby) mode is available, a call cost minimizing mode may not be operated.

As described above, according to the present invention, by previously providing call cost information for each provider according to a communication card and a mode and by selecting, when a mode is selected, a card and a mode for minimizing a call transmission cost according to a provider network to connect to based on the call cost information for each provider and a currently inserted card, the user can communicate in a cheapest cost mode within an available range.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of selecting a mode in a mobile communication terminal into which at least two cards are inserted, the method comprising:
   requesting a mode selection in response to a change of a roaming status;
   selecting the mode that identifies a card from among the at least two cards and a communication standard associated with the identified card to minimize a call cost according to a provider network based on previously stored call cost information for each provider network and at least one communication standard supported by the identified card;
   registering the selected mode in a variable value of a call cost minimizing feature; and
   connecting to a corresponding provider network using the selected mode registered in the variable value of the call cost minimizing feature when transmitting a call.

2. The method of claim 1, wherein the mode selection is also requested when the mobile communication terminal is booted, in response to a change of a service state, and when a call cost minimizing feature is requested in a menu by a user.

3. The method of claim 1, wherein each of the at least two cards enables receiving of at least one communication service of Code Division Multiple Access (CDMA) and Global System for Mobile Communication (GSM).

4. The method of claim 1, wherein selecting the mode that can minimize the call cost is automatically performed when a call cost minimizing feature is selected.

5. The method of claim 4, wherein when the call cost minimizing feature is not selected, one of a preset mode and a mode manually selected by a user is selected.

6. The method of claim 1, wherein the previously stored call cost information for each provider is at least one of stored as default information, automatically updated by a system, and updated by the user.

7. The method of claim 1 further comprising:
   selecting the provider network and the mode without user input when the mobile communication terminal is located in an area in which multiple provider networks overlap.

8. A mobile communication terminal comprising:
   at least two card slots, each card slot configured to receive inserting a card;
   a first communication unit configured to transmit, receive, and process a signal of a first communication method;
   a second communication unit configured to transmit, receive, and process a signal of a second communication method;
   an input unit configured to receive user input;
   a display unit configured to provide a visual user interface screen;
   a storage unit configured to store call cost information for at least one provider according to at least one communication method supported by each card; and
   a controller configured to request a mode selection in response to a change of a roaming status, select a mode that is associated with an inserted card and a communication method to minimize a call cost according to a provider based on cards inserted into the at least two card slots, a current geographic location of the mobile communication terminal, and the stored call cost information for the at least one provider, register the selected mode in a variable value of a call cost minimizing feature, and control one of the first communication unit and the second communication unit to use the selected mode when transmitting a call.

9. The mobile communication terminal of claim 8, wherein the at least two card slots comprise a first card slot and a second card slot, and each of the cards inserted into the at least two card slots is configured to support at least one communication method of Code Division Multiple Access (CDMA) and Global System for Mobile Communication (GSM), and a dual method.

10. The mobile communication terminal of claim 9, wherein the first communication method comprises at least one communication method of CDMA and GSM.

11. The mobile communication terminal of claim 10, wherein the second communication method comprises at least one communication method of CDMA and GSM that is not included in the first communication method.

12. The mobile communication terminal of claim 8, wherein the controller is further configured to request the mode selection when the mobile communication terminal is booted, in response to a change of a service state, and when a call cost minimizing feature is activated.

13. The mobile communication terminal of claim 8, wherein the controller is further configured to select, when the mobile communication terminal is in an area in which a plurality of provider networks overlap, a provider network and the mode for minimizing the call cost based on the call cost information for each overlapping provider and the cards inserted into the at least two card slots.

14. A communication terminal comprising:
a first communication unit configured to transmit, receive, and process signal using a Global System for Mobile Communication (GSM) communication method;
a second communication unit configured to transmit, receive, and process signal using a Code Division Multiple Access (CDMA) communication method;
a plurality of card slots for inserting cards, each card comprising a GSM card, a CDMA card, and a dual card that supports both GSM and CDMA communication methods; and
a controller configured to request a mode selection in response to a change of a roaming status, select a card and a communication method to minimize a call cost according to a provider network based on previously stored call cost information for each provider network and at least one communication method supported by each inserted card, register the selected mode in a variable value of a call cost minimizing feature, and control one of the first communication unit and the second communication unit to connect the communication terminal to a corresponding provider network using the variable value when connecting a call.

15. The communication terminal of claim 14, wherein the controller is further configured to request the mode selection when the communication terminal is booted, in response to a change of a service state, and when a call cost minimizing feature is activated in the communication terminal.

16. The communication terminal of claim 15, wherein the controller is further configured to select one of a preset mode and a mode manually selected by a user when the call cost minimizing feature is not activated in the communication terminal.

17. The communication terminal of claim 14, further comprising a storage unit configured to store the call cost information for each provider network,
wherein the controller is further configured to store the call cost information in the storage unit as default information, and update the previously stored call cost information based on one of an update received from a system and a user input.

18. The communication terminal of claim 14, wherein the controller is further configured to select the provider network and the mode when the communication terminal is located in an area in which multiple provider networks overlap.

19. The communication terminal of claim 14, wherein the controller is further configured to select a mode that can minimize a cost of the call without user input when a call cost minimizing feature is selected.

20. The mobile communication terminal of claim 14, wherein the controller is further configured to select the provider network and the mode when the mobile communication terminal is located in an area in which multiple provider networks overlap.

* * * * *